United States Patent
Philip et al.

(10) Patent No.: US 10,027,433 B2
(45) Date of Patent: Jul. 17, 2018

(54) MULTIPLE CLOCK DOMAINS IN NOC

(71) Applicant: NETSPEED SYSTEMS, San Jose, CA (US)

(72) Inventors: Joji Philip, San Jose, CA (US); Joseph Rowlands, San Jose, CA (US); Sailesh Kumar, San Jose, CA (US)

(73) Assignee: NETSPEED SYSTEMS, San Jose, CA (US)

( * ) Notice: Subject to any disclaimer, the term of this patent is extended or adjusted under 35 U.S.C. 154(b) by 426 days.

(21) Appl. No.: 13/922,053

(22) Filed: Jun. 19, 2013

(65) Prior Publication Data

US 2014/0376569 A1    Dec. 25, 2014

(51) Int. Cl.
  H04J 3/06  (2006.01)
  G06F 1/04  (2006.01)

(52) U.S. Cl.
  CPC ............. H04J 3/0658 (2013.01); G06F 1/04 (2013.01)

(58) Field of Classification Search
  CPC .................................................. H04J 3/0635
  See application file for complete search history.

(56) References Cited

U.S. PATENT DOCUMENTS

| | | |
|---|---|---|
| 5,432,785 A | 7/1995 | Ahmed et al. |
| 5,764,740 A | 6/1998 | Holender |
| 5,991,308 A | 11/1999 | Fuhrmann et al. |
| 6,003,029 A | 12/1999 | Agrawal et al. |
| 6,249,902 B1 | 6/2001 | Igusa et al. |
| 6,415,282 B1 | 7/2002 | Mukherjea et al. |
| 6,925,627 B1 | 8/2005 | Longway et al. |
| 7,065,730 B2 | 6/2006 | Alpert et al. |
| 7,318,214 B1 | 1/2008 | Prasad et al. |
| 7,590,959 B2 | 9/2009 | Tanaka |
| 7,725,859 B1 | 5/2010 | Lenahan et al. |
| 7,808,968 B1 | 10/2010 | Kalmanek, Jr. et al. |
| 7,917,885 B2 | 3/2011 | Becker |
| 8,050,256 B1 | 11/2011 | Bao et al. |
| 8,059,551 B2 | 11/2011 | Milliken |

(Continued)

FOREIGN PATENT DOCUMENTS

| | | |
|---|---|---|
| CN | 103684961 A | 3/2014 |
| WO | 2014059024 A1 | 4/2014 |

OTHER PUBLICATIONS

Kulkarni, P., Gupta, P., & Beraha, R. (Mar. 2014). Minimizing clock domain crossing in Network on Chip interconnect. In Fifteenth International Symposium on Quality Electronic Design (pp. 292-299). IEEE.*

(Continued)

*Primary Examiner* — Noel R Beharry
*Assistant Examiner* — Rodrick Mak
(74) *Attorney, Agent, or Firm* — Procopio, Cory, Hargreaves and Savitch LLP

(57) ABSTRACT

Example implementations described herein are directed to a micro-architecture of NoC router clocking which allows for a flexible Globally Asynchronous Locally Synchronous (GALS) implementation. The example implementations allow arbitrary clock domain partitions to be defined across the system. The example implementations further involve allowing the components of the NoC to be configured by the user through a NoC generation system to achieve the desired arbitrary clock domain partitioning.

17 Claims, 15 Drawing Sheets

(56) References Cited

U.S. PATENT DOCUMENTS

| | | | |
|---|---|---|---|
| 8,099,757 | B2 | 1/2012 | Riedle et al. |
| 8,136,071 | B2 | 3/2012 | Solomon |
| 8,218,448 | B1* | 7/2012 | Cox et al. .............. 370/242 |
| 8,281,297 | B2 | 10/2012 | Dasu et al. |
| 8,312,402 | B1 | 11/2012 | Okhmatovski et al. |
| 8,448,102 | B2 | 5/2013 | Kornachuk et al. |
| 8,492,886 | B2 | 7/2013 | Or-Bach et al. |
| 8,541,819 | B1 | 9/2013 | Or-Bach et al. |
| 8,543,964 | B2 | 9/2013 | Ge et al. |
| 8,601,423 | B1 | 12/2013 | Philip et al. |
| 8,630,358 | B2* | 1/2014 | Maji .................. H04L 7/02 327/1 |
| 8,635,577 | B2 | 1/2014 | Kazda et al. |
| 8,667,439 | B1 | 3/2014 | Kumar et al. |
| 8,713,221 | B1* | 4/2014 | Agrawal et al. .............. 710/57 |
| 8,717,875 | B2 | 5/2014 | Bejerano et al. |
| 8,826,058 | B1* | 9/2014 | Cox et al. ................ 713/400 |
| 2002/0071392 | A1 | 6/2002 | Grover et al. |
| 2002/0073380 | A1 | 6/2002 | Cooke et al. |
| 2002/0095430 | A1 | 7/2002 | Egilsson et al. |
| 2003/0026267 | A1* | 2/2003 | Oberman et al. ........... 370/397 |
| 2004/0216072 | A1 | 10/2004 | Alpert et al. |
| 2005/0147081 | A1 | 7/2005 | Acharya et al. |
| 2006/0067218 | A1* | 3/2006 | Clermidy ............... H04L 47/39 370/230 |
| 2006/0161875 | A1 | 7/2006 | Rhee |
| 2006/0174158 | A1* | 8/2006 | Check ................ G06F 13/4022 714/10 |
| 2007/0025382 | A1* | 2/2007 | Jones ............... H04L 12/40019 370/431 |
| 2007/0038782 | A1* | 2/2007 | Jones ................. G06F 13/4059 709/250 |
| 2007/0118320 | A1 | 5/2007 | Luo et al. |
| 2007/0244676 | A1 | 10/2007 | Shang et al. |
| 2007/0256044 | A1 | 11/2007 | Coryer et al. |
| 2007/0267680 | A1 | 11/2007 | Uchino et al. |
| 2008/0005402 | A1* | 1/2008 | Kim et al. ................. 710/52 |
| 2008/0072182 | A1 | 3/2008 | He et al. |
| 2008/0120129 | A1 | 5/2008 | Seubert et al. |
| 2008/0215786 | A1* | 9/2008 | Goossens ............. H04L 12/417 710/243 |
| 2009/0070726 | A1 | 3/2009 | Mehrotra et al. |
| 2009/0268677 | A1 | 10/2009 | Chou et al. |
| 2009/0313592 | A1 | 12/2009 | Murali et al. |
| 2010/0040162 | A1 | 2/2010 | Suehiro |
| 2011/0022754 | A1* | 1/2011 | Cidon ................. G06F 15/7825 710/107 |
| 2011/0026405 | A1* | 2/2011 | Takagi .................. H04L 45/00 370/235 |
| 2011/0035523 | A1 | 2/2011 | Feero et al. |
| 2011/0060831 | A1 | 3/2011 | Ishii et al. |
| 2011/0072407 | A1 | 3/2011 | Keinert et al. |
| 2011/0154282 | A1 | 6/2011 | Chang et al. |
| 2011/0276937 | A1 | 11/2011 | Waller |
| 2011/0320854 | A1* | 12/2011 | Elrabaa .................. 713/600 |
| 2012/0022841 | A1 | 1/2012 | Appleyard |
| 2012/0023473 | A1 | 1/2012 | Brown et al. |
| 2012/0026917 | A1 | 2/2012 | Guo et al. |
| 2012/0110541 | A1 | 5/2012 | Ge et al. |
| 2012/0155250 | A1 | 6/2012 | Carney et al. |
| 2013/0028083 | A1* | 1/2013 | Yoshida ............... H04L 49/60 370/230 |
| 2013/0051397 | A1 | 2/2013 | Guo et al. |
| 2013/0080073 | A1 | 3/2013 | de Corral |
| 2013/0103369 | A1 | 4/2013 | Huynh et al. |
| 2013/0151215 | A1 | 6/2013 | Mustapha |
| 2013/0159944 | A1 | 6/2013 | Uno et al. |
| 2013/0174113 | A1 | 7/2013 | Lecler et al. |
| 2013/0207801 | A1 | 8/2013 | Barnes |
| 2013/0219148 | A1 | 8/2013 | Chen et al. |
| 2013/0263068 | A1 | 10/2013 | Cho et al. |
| 2013/0326458 | A1 | 12/2013 | Kazda et al. |
| 2014/0068132 | A1 | 3/2014 | Philip et al. |
| 2014/0092740 | A1 | 4/2014 | Wang et al. |
| 2014/0098683 | A1 | 4/2014 | Kumar et al. |
| 2014/0115218 | A1 | 4/2014 | Philip et al. |
| 2014/0115298 | A1 | 4/2014 | Philip et al. |

OTHER PUBLICATIONS

Kasapaki et al. Router Designs for an Asynchronous Time-Division-Multiplexed Network-on-Chip. Sep. 2013, IEEE, pp. 1-8.*

Sarkar, Souradip. Multiple Clock Domain Synchronization for Network on Chips. Dec. 2007. Washington State University thesis for Master of Science in Computer Engineering. pp. 1-68.*

Goosens et al. Formal Methods for Network on Chips. 2005. IEEE. pp. 1-2.*

Abts, D., et al., Age-Based Packet Arbitration in Large-Radix k-ary n-cubes, Supercomputing 2007 (SC07), Nov. 10-16, 2007, 11 pgs.

Das, R., et al., Aergia: Exploiting Packet Latency Slack in On-Chip Networks, 37th International Symposium on Computer Architecture (ISCA '10), Jun. 19-23, 2010, 11 pgs.

Ebrahimi, E., et al., Fairness via Source Throttling: A Configurable and High-Performance Fairness Substrate for Multi-Core Memory Systems, ASPLOS '10, Mar. 13-17, 2010, 12 pgs.

Grot, B., Preemptive Virtual Clock: A Flexible, Efficient, and Cost-Effective QOS Scheme for Networks-on-Chip, Micro '09, Dec. 12-16, 2009, 12 pgs.

Grot, B., Kilo-NOC: A Heterogeneous Network-on-Chip Architecture for Scalability and Service Guarantees, ISCA '11, Jun. 4-8, 2011, 12 pgs.

Grot, B., Topology-Aware Quality-of-Service Support in Highly Integrated Chip Multiprocessors, 6th Annual Workshop on the Interaction between Operating Systems and Computer Architecture, Jun. 2006, 11 pgs.

Jiang, N., et al., Performance Implications of Age-Based Allocations in On-Chip Networks, CVA MEMO 129, May 24, 2011, 21 pgs.

Lee, J. W., et al., Globally-Synchronized Frames for Guaranteed Quality-of-Service in On-Chip Networks, 35th IEEE/ACM International Symposium on Computer Architecture (ISCA), Jun. 2008, 12 pgs.

Lee, M. M., et al., Approximating Age-Based Arbitration in On-Chip Networks, PACT '10, Sep. 11-15, 2010, 2 pgs.

Li, B., et al., CoQoS: Coordinating QoS-Aware Shared Resources in NoC-based SoCs, J. Parallel Distrib. Comput., 71(5), May 2011, 14 pgs.

International Search Report and Written Opinion for PCT/US2013/064140, dated Jan. 22, 2014, 9 pgs.

International Search Report and Written Opinion for PCT/US2014/012003, dated Mar. 26, 2014, 9 pgs.

International Search Report and Written Opinion for PCT/US2014/012012, dated May 14, 2014, 9 pgs.

Ababei, C., et al., Achieving Network on Chip Fault Tolerance by Adaptive Remapping, Parallel & Distributed Processing, 2009, IEEE International Symposium, 4 pgs.

Beretta, I, et al., A Mapping Flow for Dynamically Reconfigurable Multi-Core System-on-Chip Design, IEEE Transactions on Computer-Aided Design of Integrated Circuits and Systems, Aug. 2011, 30(8), pp. 1211-1224.

Gindin, R., et al., NoC-Based FPGA: Architecture and Routing, Proceedings of the First International Symposium on Networks-on-Chip (NOCS'07), May 2007, pp. 253-262.

Yang, J., et al., Homogeneous NoC-based FPGA: The Foundation for Virtual FPGA, 10th IEEE International Conference on Computer and Information Technology (CIT 2010), Jun. 2010, pp. 62-67.

* cited by examiner

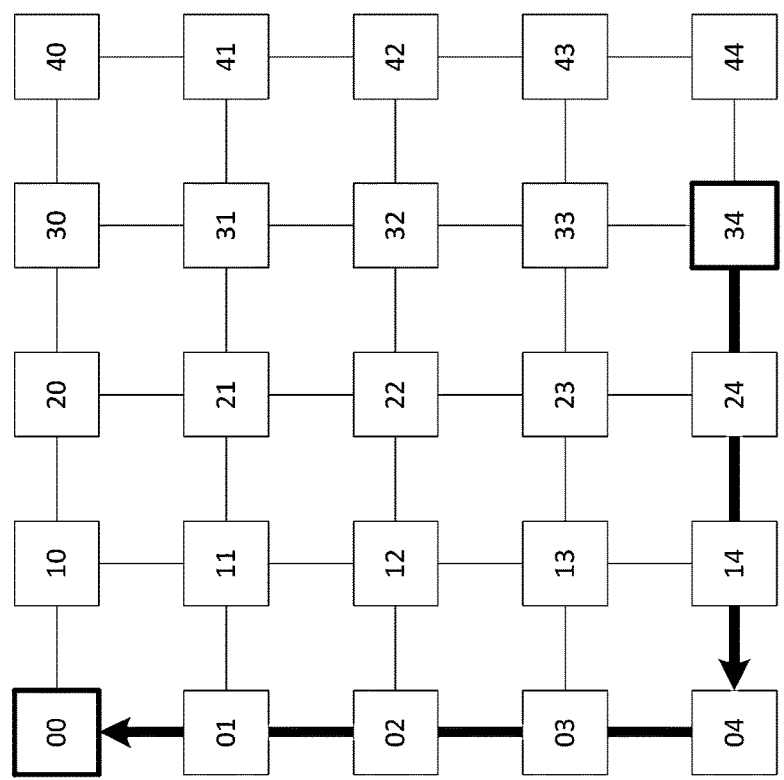

FIG. 10(b)

| Router Rn | |
|---|---|
| Input port clock | Domain clock |
| NORTH CLK | CLK A |
| EAST CLK | CLK B |
| SOUTH CLK | CLK C |
| WEST CLK | CLK F |
| CORE CLK | CLK F |

| Router Rm | |
|---|---|
| Input port clock | Domain clock |
| NORTH CLK | CLK F |
| EAST CLK | CLK C |
| SOUTH CLK | CLK C |
| WEST CLK | CLK E |
| CORE CLK | CLK C |

MULTIPLE CLOCK DOMAINS IN NOC

BACKGROUND

Technical Field

Methods and example embodiments described herein are generally directed to interconnect architecture, and more specifically, to network-on-chip system interconnect architecture.

Related Art

The number of components on a chip is rapidly growing due to increasing levels of integration, system complexity and shrinking transistor geometry. Complex System-on-Chips (SoCs) may involve a variety of components e.g., processor cores, DSPs, hardware accelerators, memory and I/O, while Chip Multi-Processors (CMPs) may involve a large number of homogenous processor cores, memory and I/O subsystems. In both systems, the on-chip interconnect plays a key role in providing high-performance communication between the various components.

Due to scalability limitations of traditional buses and crossbar based interconnects, Network-on-Chip (NoC) has emerged as a paradigm to interconnect a large number of components on the chip. NoC is a global shared communication infrastructure made up of several routing nodes interconnected with each other using point-to-point physical links. Messages are injected by the source and are routed from the source node to the destination over multiple intermediate nodes and physical links. The destination node then ejects the message and provides it to the destination. For the remainder of the document, terms 'components', 'blocks' 'hosts' or 'cores' will be used interchangeably to refer to the various system components which are interconnected using a NoC. Terms 'routers' and 'nodes' will also be used interchangeably. Without loss of generalization, the system with multiple interconnected components will itself be referred to as 'multi-core system'.

There are several possible topologies in which the routers can connect to one another to create the system network. Bi-directional rings (as illustrated in FIG. 1(a)) and 2-D mesh (as illustrated in FIG. 1(b)) are examples of topologies in the related art.

As illustrated in FIG. 2 a full 2D mesh is comprised of a grid structure, with a router at each cross point of the grid. The grid has a specific number of routers on X and Y axes. This defines the size of the network, 5×5 being the size in this example. Each router is identified on the grid using its XY co-ordinate. In the figure, origin is at upper left corner of the grid and each router depicts its ID or XY co-ordinate. Each router on the grid has four direction ports and on each of these ports the router can transmit and receive messages over the interconnect wires which form point to point link between the router and the next router along the port. Each router also has one or more host ports through which it connects to host blocks using point-to-point links. The host blocks receives and/or transmits messages from and/or to the network through the host ports.

Packets are message transport units for intercommunication between various components. Routing involves identifying a path which is a set of routers and physical links of the network over which packets are sent from a source to a destination. Components are connected to one or multiple ports of one or multiple routers; with each such port having a unique identification (ID). Packets can carry the destination's router and port ID for use by the intermediate routers to route the packet to the destination component.

Examples of routing techniques include deterministic routing, which involves choosing the same path from A to B for every packet. This form of routing is oblivious of the state of the network and does not load balance across path diversities which might exist in the underlying network. However, deterministic routing is simple to implement in hardware, maintains packet ordering and easy to make free of network level deadlocks. Shortest path routing minimizes the latency as it reduces the number of hops from the source to destination. For this reason, the shortest path is also the lowest power path for communication between the two components. Dimension order routing is a form of deterministic shortest path routing in two-dimensional (2D) mesh networks. Adaptive routing can dynamically change the path taken between two points on the network based on the state of the network. This form of routing may be complex to analyze for deadlocks and have complexities associated with maintaining packet ordering. Because of these implementation challenges, adaptive routing is rarely used in practice.

FIG. 2 illustrates an example of dimension order routing in a two dimensional mesh. More specifically, FIG. 2 illustrates XY routing from node '34' to node '00'. In the example of FIG. 2, each component is connected to only one port of one router. A packet is first routed in the X dimension (−X or West direction in this case) until it reaches node '04' where the X co-ordinate is the same as destination's X co-ordinate. The packet is next routed in the Y (+Y or North direction in this case) dimension until it reaches the destination node.

Deterministic algorithms like dimension order routing can be implemented using combinatorial logic at each router. Routing algorithms can also be implemented using look-up tables at the source node or at each router along the path on the network. Source routing involves the source node embedding routing information for each packet into the packet header. In its simplest form, this routing information is an ordered list of output links to take on each router along the path. The routing information is updated at each node to shift out the information corresponding to the current hop. A distributed approach to table based routing is using lookup tables at each hop in the network. These tables store the outgoing link information for each destination through the router. Table based implementation of routing algorithms offer additional flexibility and is more suited to dynamic routing.

An interconnect may contain multiple physical networks. Over each physical network, there may exist multiple virtual networks, wherein different message types are transmitted over different virtual networks. Virtual channels provide logical links over the physical channels connecting two ports. Each virtual channel can have an independently allocated and flow controlled flit buffer in the network nodes. In any given clock cycle, only one virtual channel can transmit data on the physical channel.

NoC interconnects often employ wormhole routing, wherein, a large message or packet is broken into small pieces called flits (also called flow control digits). The first flit is the header flit which holds information about this packet's route and key message level info along with some payload data and sets up the routing behavior for all subsequent flits associated with the message. Zero or more body flits follows the head flit, containing the remaining payload of data. The final flit is tail flit which in addition to containing the last payload also performs some book keeping to close the connection for the message. In wormhole flow control, virtual channels are often implemented.

The term "wormhole" refers to the way messages are transmitted over the channels: When the head of a packet arrives at an input, the destination can be determined before the full message arrives. This allows the router to quickly set up the route upon arrival of the head flit and then transparently forward the remaining body flits of the packet. Since a message is transmitted flit by flit, it may occupy several flit buffers along its path at different routers, creating a worm-like image.

FIG. 3 illustrates a related art scheme for connecting a block 301 in a SoC to the NoC interconnect. The block attaches to the NoC through a bridge or network interface unit (NIU) 302 which translates messages from the block into packetized format for the NoC. The other side of the NIU attaches to one or more port of one or more NoC routers 303. This example shows a router with 5-ports, such as the one in a 2D mesh NoC. Ports of the router are connected to adjacent routers through point to point links.

One facet for employing Network-on-chip technology for interconnects in an SoC is the micro-architecture of components of the NoC and the physical design of the whole NoC infrastructure in conjunction with blocks of the SoC. The physical design further encompasses aspects of area, frequency, floor-planning, placement and routing, power and clock distribution, timing closure etc. Many digital systems in the related art employed full synchronous designs, where operations in the system are coordinated by a single global clock switching all the sequential elements of the system. For proper operation of such systems, there is a fundamental requirement that a given clock edge arrives at all sequential elements of the system simultaneously. However, this is hard to achieve in practice, and all digital systems exist with finite clock skews which have a bearing on the maximum frequency achievable by the synchronous system. For systems of reasonable size and relatively low frequency of operation, some clock skew is tolerable and has been managed using various physical design techniques. In these cases, a fully synchronous implementation is the preferred approach due to its simplicity and abundance of mature tools and methodology for silicon implementation.

With rapid Complementary Metal Oxide Semiconductor (CMOS) process scaling and increasing system complexity, more and more functionality is being integrated on a single silicon die. Gate delays have seen significant reduction, but wire delays do not have that trend. Hence, even though the clock frequencies have increased to keep up with increased performance requirements, metal wiring used to distribute clocks and signals on chip hasn't had major improvements. Routing delays and clock skew now constitute a significant percentage of the clock cycle time. Skew balanced distribution of a global clock to the massive number of sequential elements on a large Si die has become largely impractical and prohibitively expensive in terms of area and power consumption. Further, the large number of heterogeneous components on a die also means that they require different operating frequencies and independent clock on/off control for better power management.

The trend has been for globally asynchronous locally synchronous (GALS) systems. A basic schematic of such a system is illustrated in FIG. 4. Here large blocks 401 form local islands of fully synchronous designs, with different blocks of the system operating asynchronously to each other. The interconnection network 402 of the system handles the synchronization of communications among the GALS blocks. This allows skew balanced clock distribution to be contained to the relatively smaller areas of each block 401.

SUMMARY

The present inventive concept discloses a micro-architecture of NoC router clocking which enables a flexible Globally Asynchronous Locally Synchronous (GALS) implementation. The presented method allows arbitrary clock domain partitions to be defined across the system. The presented inventive concept further describes how the components of the NoC can be configured by the user through a NoC generation system to achieve the desired arbitrary clock domain partitioning.

BRIEF DESCRIPTION OF THE DRAWINGS

FIG. 2 illustrates an example of XY routing in a two dimensional mesh;

FIG. 10(b) illustrates the clocks connected to router clocks for two routers Rm and Rn in the network, in accordance with an example implementation.

DETAILED DESCRIPTION

Two clocks are synchronous to each other, if they have the same frequency and phase relationships. Ratio-synchronous clocks are derived from the same source and their frequencies have a fixed integer ratio. Mesochronous clocks have the same frequency but an arbitrary phase difference between them. Asynchronous clocks have completely arbitrary frequency and phase relationship. Since asynchronous clocks represent a generalized relationship between two clocks, the example implementations herein are described using asynchronous clock domains. However, other clock relationships can be supported in the example implementations, and the inventive concept as described herein is not restricted to asynchronous clocks. The clock domain crossing infrastructure could be different, but the fundamental elements of the disclosed invention remain the same.

Figure 1B:
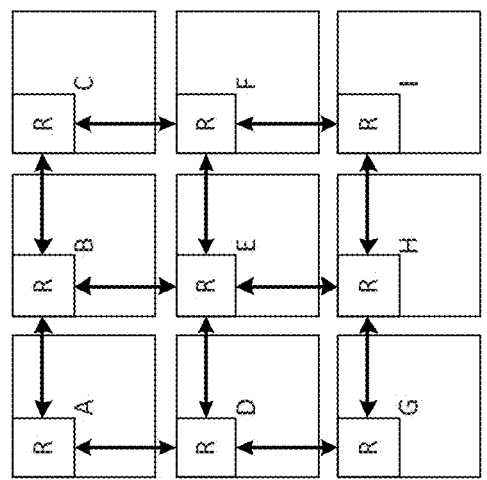
FIG. 1(a) and FIG. 1(b) illustrate Bidirectional Ring and Mesh NoC Topologies.
Figure 1A:
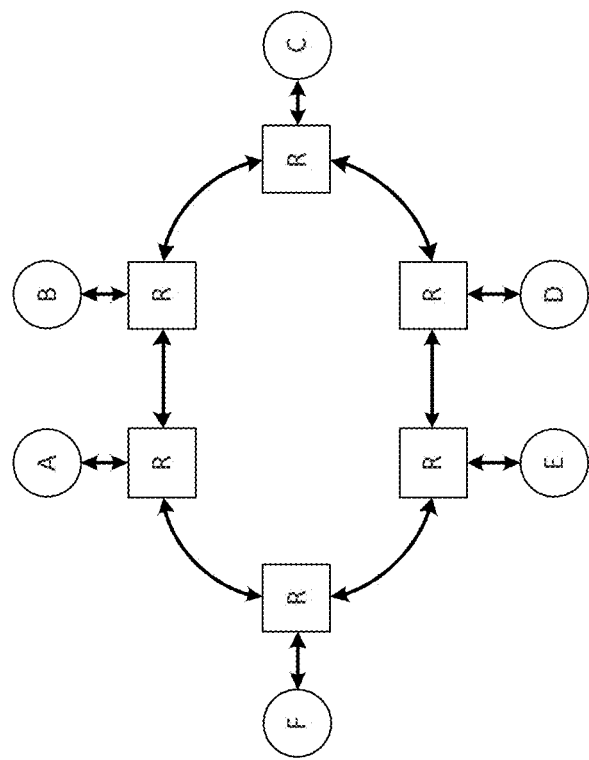
Figure 3:
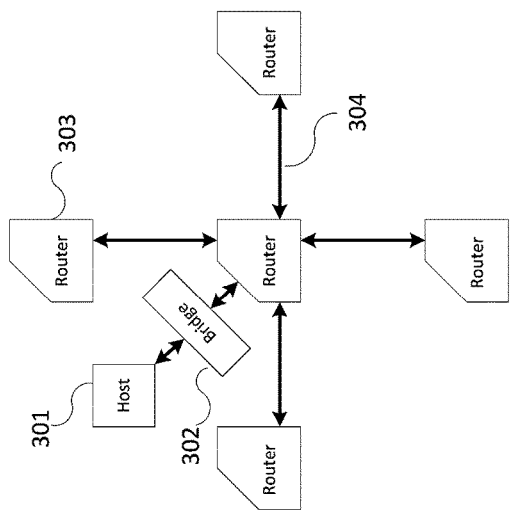
FIG. 3 illustrates a related art example of a host block attached to a NoC.
Figure 4:
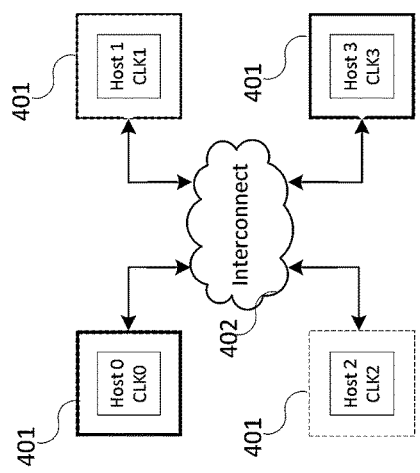
FIG. 4 illustrates a basic example of a GALS system.
Figure 5:
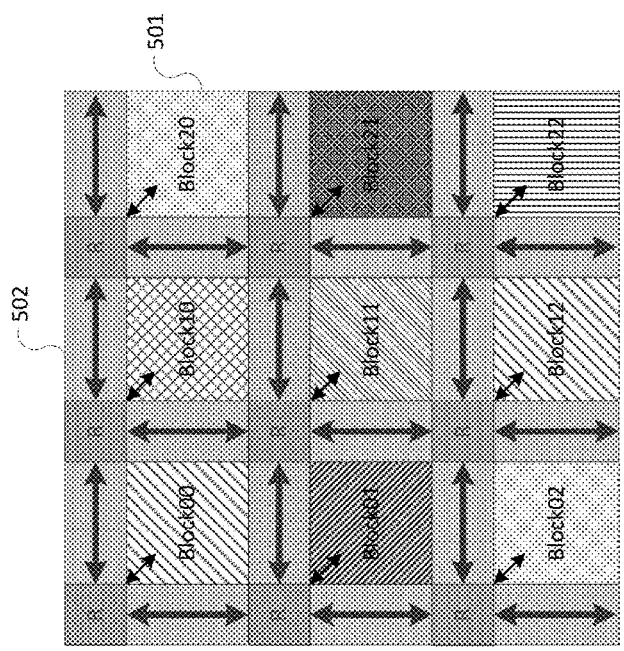
FIG. 5 illustrates an example implementation of NoC based GALS system.

A common implementation of a GALS paradigm in systems using NoC interconnect is illustrated in FIG. 5. Here the host blocks 501 are islands of synchronous logic which is asynchronous to the NoC infrastructure 502. All logic in the NoC, including routers, buffers, bridges etc. operates synchronously on a single NoC clock and each host block could be operating in an independent clock domain asynchronous to the NoC clock. Decoupling between the host's clock and the NoC clock is performed in the NI. This system has the advantages of skew balancing restricted and localized within the sequential elements in each host block, without any consideration of skew between blocks. However, all sequential elements in the NoC interconnect must remain skew balanced. The inherent scalability advantage offered by NoC implies that in large systems the components making up the NoC interconnect are going to be widely spread across the die. So the prospect of keeping the entire NoC running off a single synchronous clock is as daunting as traditional full synchronous designs. Distributing a balanced clock to all the interconnect elements will be a challenge in addition to being expensive in terms of area and power.

Figure 6:
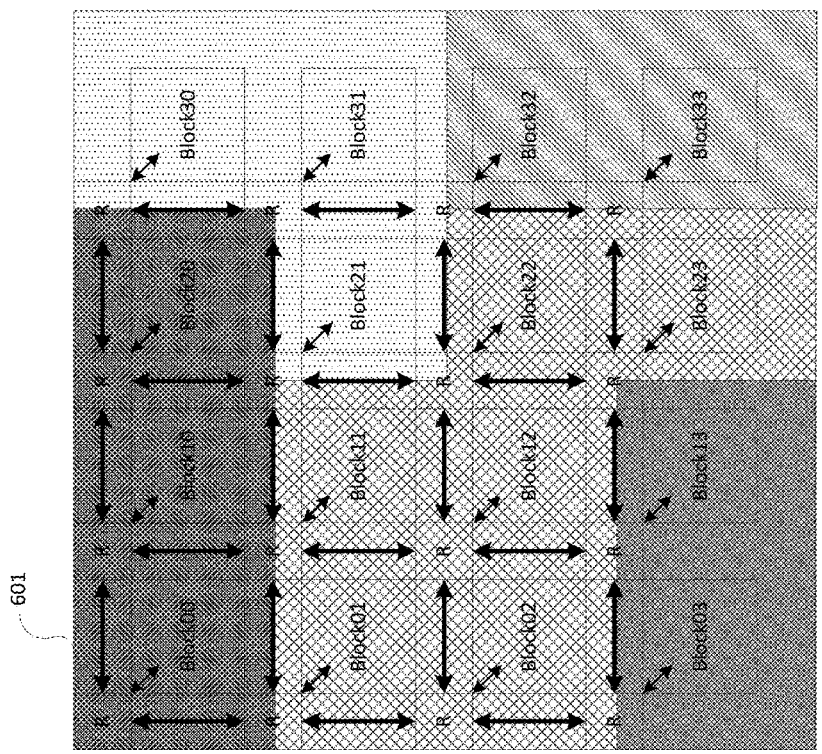
FIG. 6 illustrates an example implementation of a NoC based GALS which allows flexible clock domain partitions on the floor plan of the SoC.

A more flexible GALS implementation is where the asynchronous clock boundaries can be fully arbitrary on the floor plan 601 of the SoC. An example is shown in FIG. 6. This requires that the interconnect allows clock domain crossing across any link of the interconnect. The example implementations of the present application are directed to such a NoC architecture and the micro-architecture of the NoC router, to achieve such flexibility.

The example implementations of the present application are directed to defining GALS systems where the system interconnect can be made up of different sections operating at completely asynchronous clock domains. This is achieved by allowing any point to point link between two routers of the NoC to be defined as the point of clock domain crossing. Communication on a link between two routers is bidirectional. Each unidirectional section in turn comprises data and control signal flowing in one direction and credit return flowing in the opposite direction.

Figure 7:
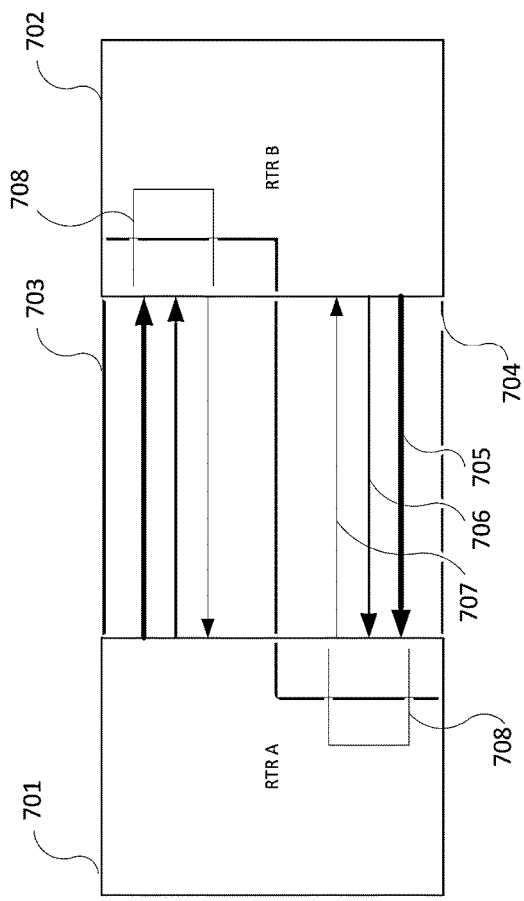
FIG. 7 illustrates clock domain crossing on a router to router point-to-point link, wherein constituents of the link bundle are shown, in accordance with an example implementation.

FIG. 7 illustrates the constituents of a link between routers, in accordance with an example implementation. Two routers, 701 and 702 are on their respective ends of the link. The link 703 for transmission of data from router A (701) to router B (702) operates in router A's clock domain. The link 704 for transmission of data from router B to router A operates in router B's clock domain. For link 704, the data 705 on the link and the control 706 flow from router B to router A, and the credit signal 707 flows in the opposite direction to the transmitted data and control.

Figure 8:
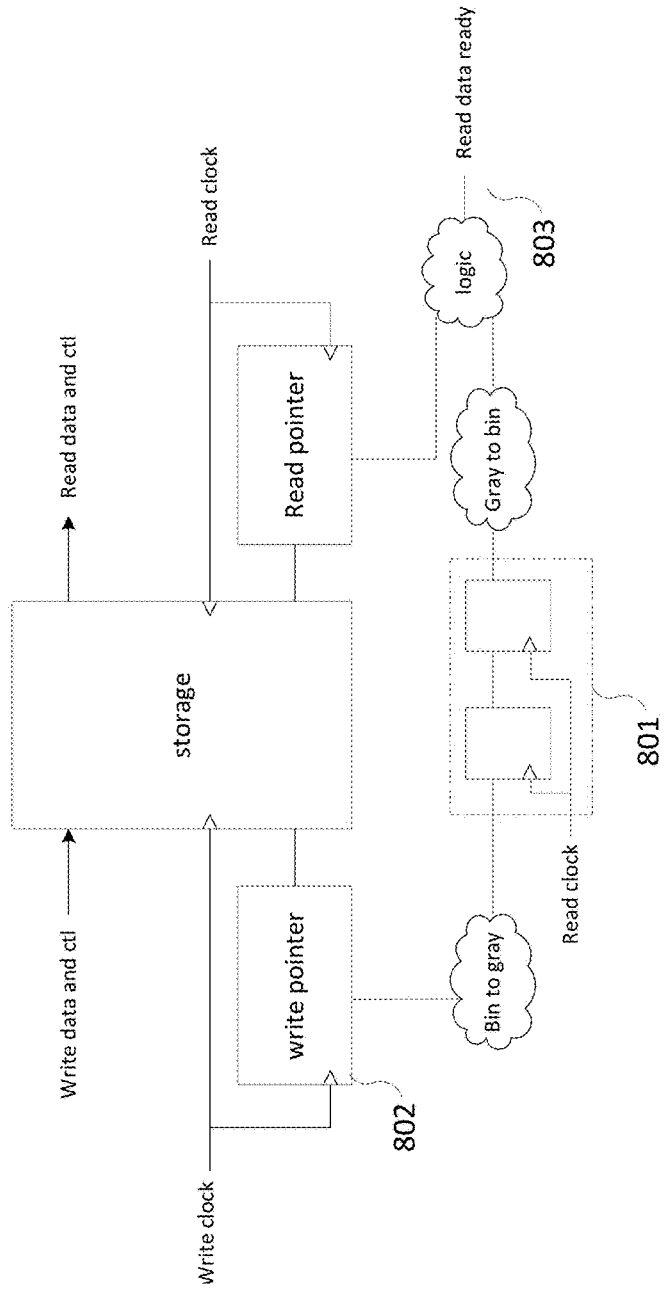
FIG. 8 illustrates a dual clock FIFO used for data synchronization for an asynchronous clock relationship, in accordance with an example implementation.

A router input port may include an input buffer 708, into which data from the link is written. The following concepts apply as is to routers with multiple virtual channels, in which case there are multiple input buffers (one per virtual channel, or VC) on each input port. The example implementation of the present application incorporates the use of this input buffer as a clock domain crossing structure. In an example implementation of the present application, the input buffer 708 acts as an asynchronous First In First Out (FIFO) used for crossing clock domains for the data. This is a standard dual clock FIFO design which uses gray coded pointers exchanged between the read and write clock domains through dual-rank synchronizers 801 as shown in FIG. 8. Note that only write pointer 802 is synchronized to the read domain to generate the buffer empty/data ready signal 803, which is used to control the read of data from the buffer. Full signal for flow control on the write domain is not generated for this buffer as a credit based flow control scheme is employed, as described below. A different micro-architecture of the input buffer can be employed to handle other clock domain relationships, without deviating from the essence of the NoC clock domain partitioning architecture of the example implementations of the present application.

Figure 9:
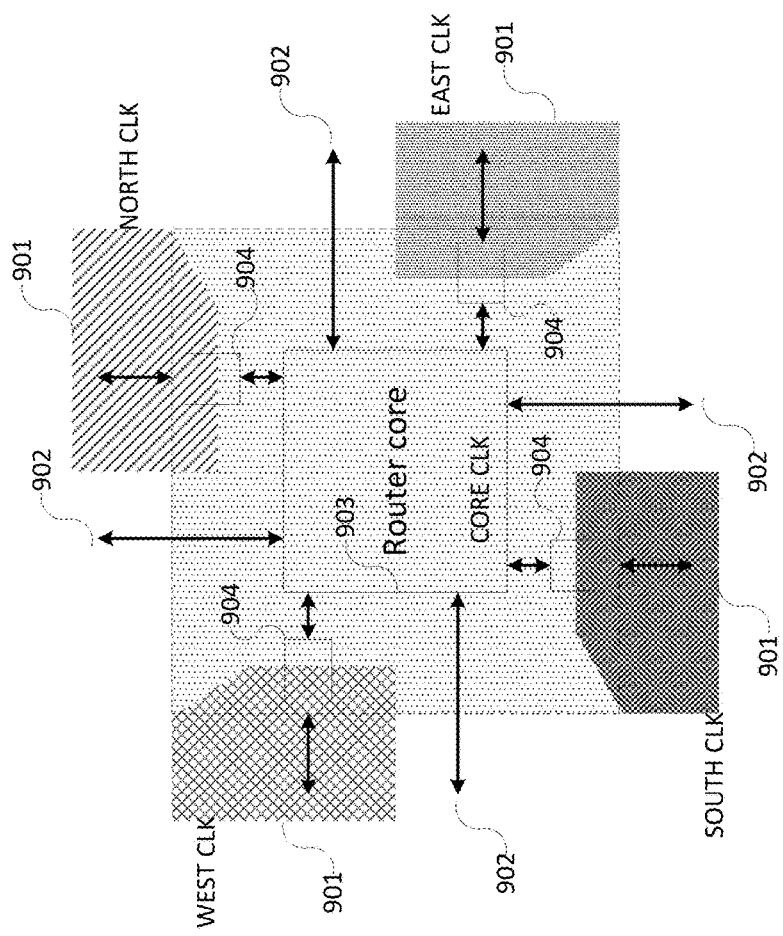
FIG. 9 illustrates a schematic of the proposed router micro-architecture showing various router clocks and clock domain crossing at the input buffers, in accordance with an example implementation.
Figure 10A:
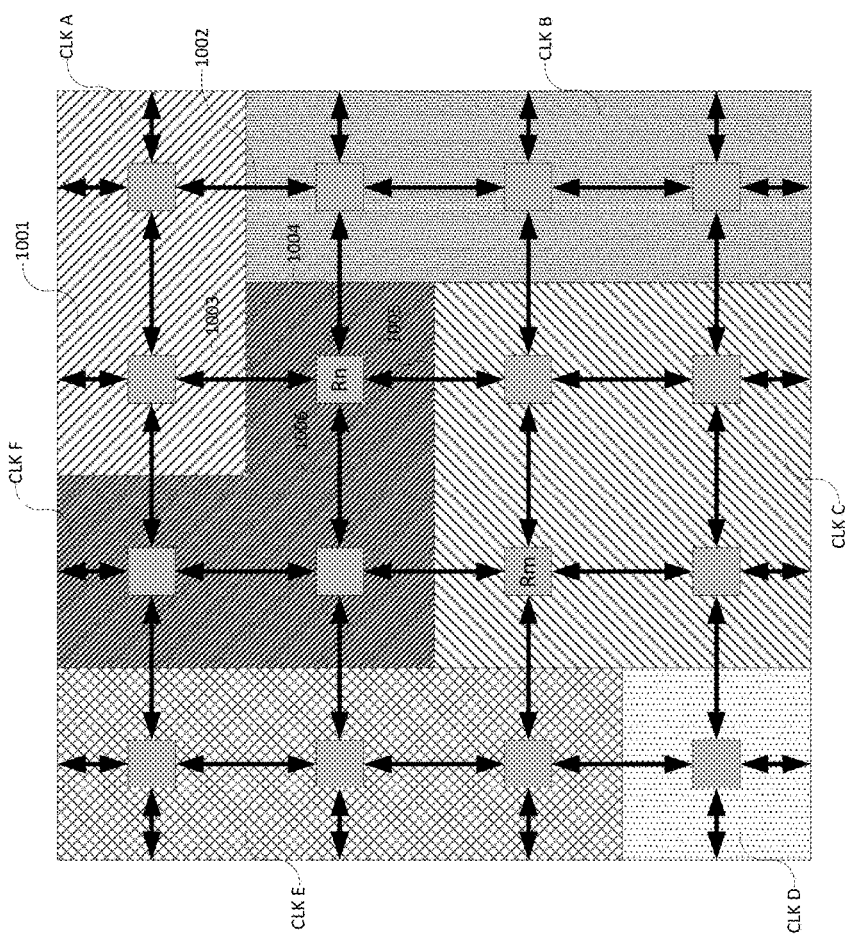
FIG. 10(a) illustrates how the different router clocks can be connected to realize flexible clock domain partitions, in accordance with an example implementation.

FIG. 9 illustrates a simplified schematic of the proposed router micro-architecture which employs its input buffers 904 for clock domain crossing, in accordance with an example implementation. Each input port 901 defines a write clock for the buffer. This is same as the clock used by the previous router to transmit data to it. Read clock of all the inputs buffers is the router core clock 903 which synchronously drives all the internal router logic. All output ports 902 of the router are driven by the core clock of the router FIG. 10(a) and FIG. 10(b) illustrate examples of how the router input and core clocks can be connected to realize different domain partitioning in a NoC. FIG. 10(a) illustrates an example NoC with different shaded regions such as 1001 representing different clock domains CLK A to CLK F. NoC links such as 1002 which spans across two different shaded regions represent NoC links which require clock domain crossing. Routers Rn would require clock domain crossing on its North (1003), East (1004) and South (1005) links and no crossing on West (1006) link. FIG. 10(b) specifies in tabular form the clock domains which drive the input ports clocks and core clock of routers Rn and Rm.

The router micro-architecture of example implementations of the present application utilizes parameters to independently specify and configure the clock domain relationship and synchronization requirements on each input port. This allows the synchronization logic and infrastructure to be conditionally included or excluded from the routers of a NoC depending on the clock domain partitioning required in the system. The user can provide the clock domain specifications through a NoC architecture and design exploration software module. The software module in turn performs required NoC optimizations and generates the NoC with routers and other components configured to meet the specifications.

Credit based flow control is used on the links between routers. Transmitting end maintains a count of the number of flits it can send to the receiving end. This count reflects the number of flit storage entries available in the input buffer of the receiving router. Transmitting router ceases to send data if it exhausts its credit count. As the receiving router unloads and processes flits from its input buffer, it notifies the upstream router of the space now available in its input buffer. This is in the form of a credit return signal which is sent in the upstream direction on every read from the input buffer. Read and hence the credit signal is generated at the core clock of the receive router. However, the signal is used by the upstream router's transmit clock which is same as the input port clock of the receive router. Hence, the read or credit signal is synchronized from the receive router's core clock to input port clock. The credit signal is not a low frequency level signal; it can potentially transition every clock cycle. Hence synchronizing it by passing through a simple double rank synchronizer is not feasible for all clock ratios. A double rank synchronizer can cause loss of credits with potentially drastic functional impact on flow control across the interface. One possible technique for synchronizing the credit signal is to pass it through a single bit dual clock FIFO similar to the one used to synchronize the data, but with reversed clock inputs, i.e. write the FIFO at core clock and read from it at the port's input clock. The example implementations of the present application utilize an efficient circuit for credit synchronization to reduce the overhead associated with using a full dual-clock FIFO for credit bit synchronization.

The credit synchronization circuit is based on a premise that the credit signal is trying to convey an accurate count of the number of reads performed out of the input buffer. This count is already available in the data synchronization FIFO, in the form of its read pointer. The read pointer is converted into gray code and synchronized to the write clock (port's input clock) as in a regular dual clock FIFO. The synchronized gray coded read pointer is converted back into binary format. This binary read count might have missing values based on the clock ratios; however it conveys the incrementing trend of the read pointer. A tracking counter with the same number of bits as the read pointer is maintained in the write clock domain. This counter starts at 0 (same as the reset state of the read pointer). The tracking counter's function is to track the number of reads that have occurred on the read clock domain. This is done by incrementing the tracking counter by one every cycle of the write domain clock as long as it is lesser than the synchronized binary read pointer. The tracking counter stops incrementing when it catches up and equals the current value of the synchronized read pointer. The write domain increment signal for the tracking counter is equivalent to the original credit signal from the read domain. This signal is used as the synchronized credit signal which is sent back to the upstream router. Note that this signal can be pipelined on the upstream link without loss of functional correctness.

Figure 11:
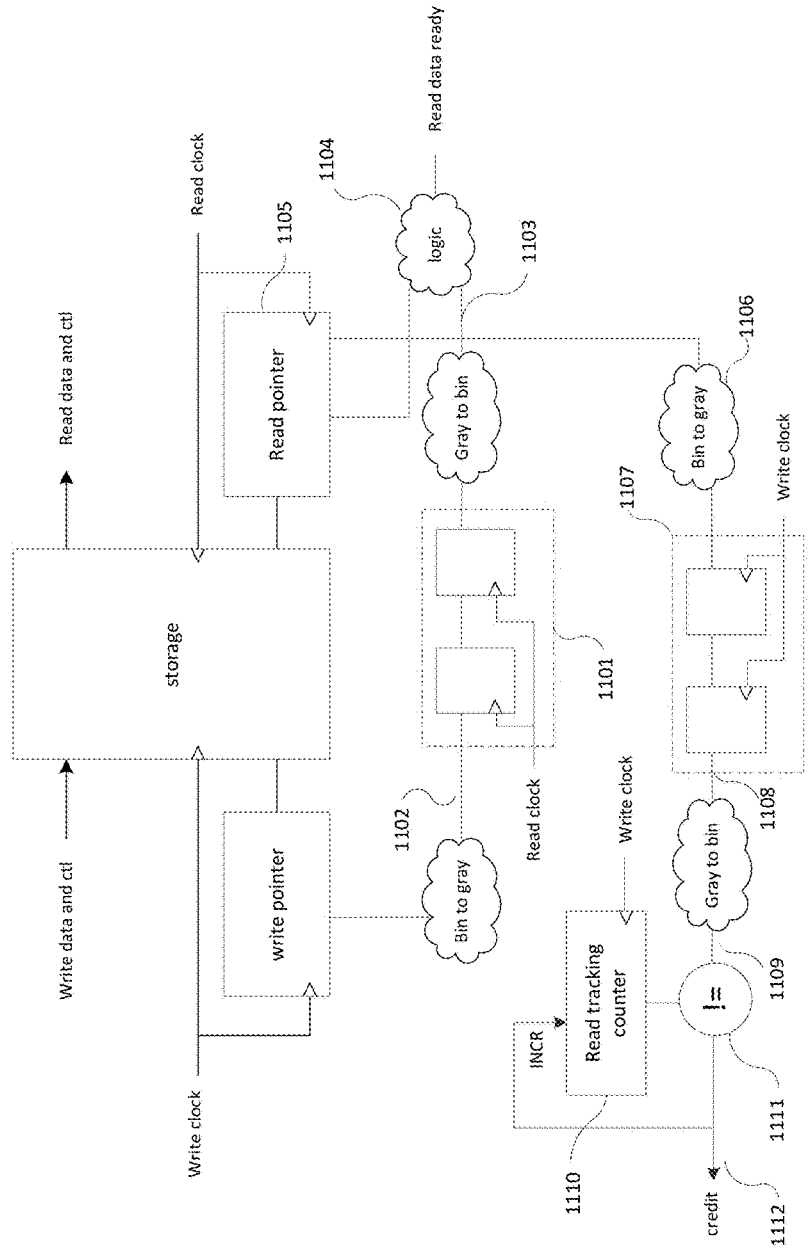
FIG. 11 illustrates the flow-control credit synchronization circuit added to the input buffer, in accordance with an example implementation.

FIG. 11 illustrates the input buffer with the credit synchronization circuit added, in accordance with an example implementation. The dual rank synchronizer 1101 carries the gray coded write pointer 1102 from the write to the read clock domain. In the read clock domain, the gray coded write pointer is converted back to binary 1103. Logic 1104 uses binary 1103 and the binary read pointer 1105 to generate the data ready signal.

Read pointer 1105 is converted from binary to gray by block 1106. This gray coded value is synchronized from the read clock domain to write clock domain by dual rank synchronizer 1107. Synchronize gray coded read pointer in the write domain 1108 is converted back to binary format 1109. Binary value of read pointer synchronized to write clock domain 1109 is compared with the value of a binary read tracking counter 1110, by an equivalence comparator 1111. As long as values 1109 and 1110 are not equal, 1110 is incremented by one and a credit 1112 is sent upstream. Note that the tracking counter operates on write clock. The handling of credit and data synchronization allows the router's port interfaces to remain the same irrespective of the clock domain relationship across the link.

Figure 12:
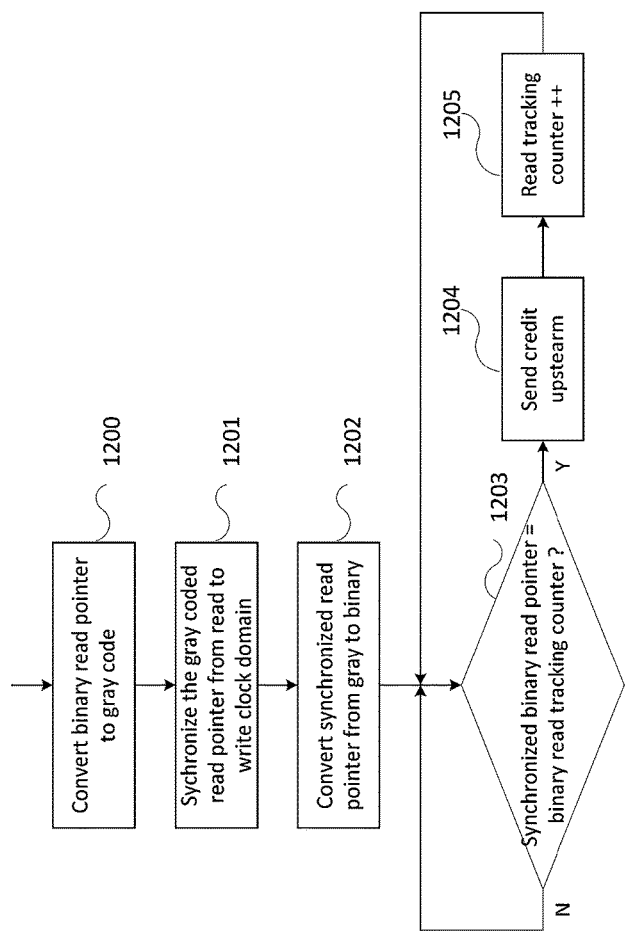
FIG. 12 illustrates an example flow diagram for the credit synchronization circuit.

FIG. 12 illustrates the credit synchronization logic in the form a flow diagram. At 1200, the system may convert a binary read pointer to gray code. At 1201, the gray coded read pointer is synchronized from the read to the write clock domain. At 1202, the synchronized read pointer is converted from gray to binary. At 1203, a check is repeatedly performed to see if the synchronized binary read pointer is the same as the binary read tracking counter. If so (Y) then the a credit is sent upstream at 1204 and the read tracking counter is incremented at 1205.

Figure 13:
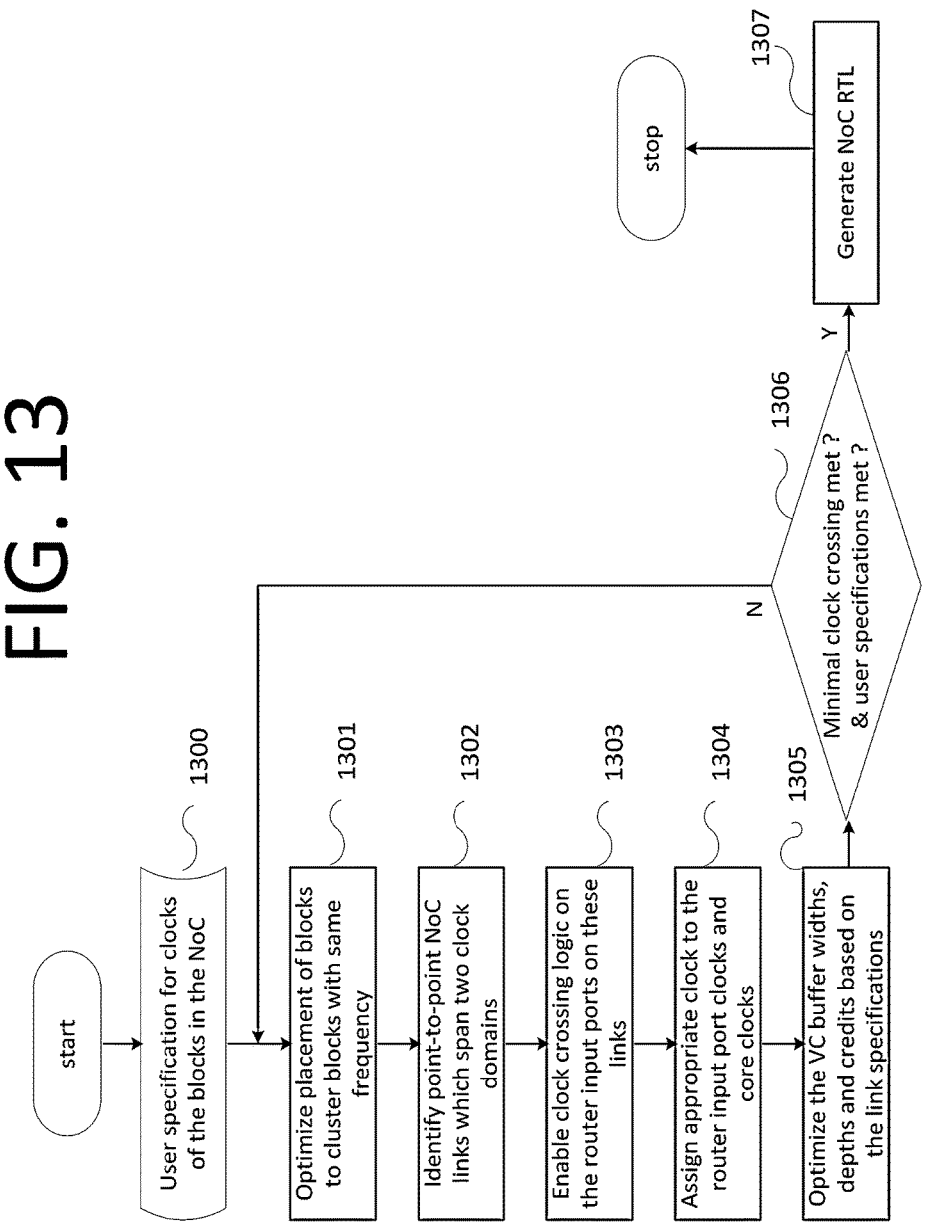
FIG. 13 illustrates an example flow diagram for a software system which constructs and optimizes a multi-clock domain NoC using the presented architecture

FIG. 13 illustrates an example flow that can be used by a software platform to optimize and configure a NoC with multiple clock domains using the architecture disclosed in the application. At 1300, the system may receive a user specification for clocks of the blocks in the NoC. At 1301, the placement of blocks is optimized to cluster the blocks having the same frequency. At 1302, the point to point NoC links that span two clock domains are identified. At 1303, the clock crossing logic is enabled on the router input ports on the identified links. At 1304, a clock is assigned to the router input port clocks and core clocks. At 1305, the VC buffer widths, depths and credits are optimized based on the link specifications.

At 1306, a check is performed to determine clock crossing is minimized and the user specifications are met. If so (Y) then the flow proceeds to 1307 to generate the NoC register transfer level (RTL). If not (N), then the flow repeats at 1301.

Figure 14:
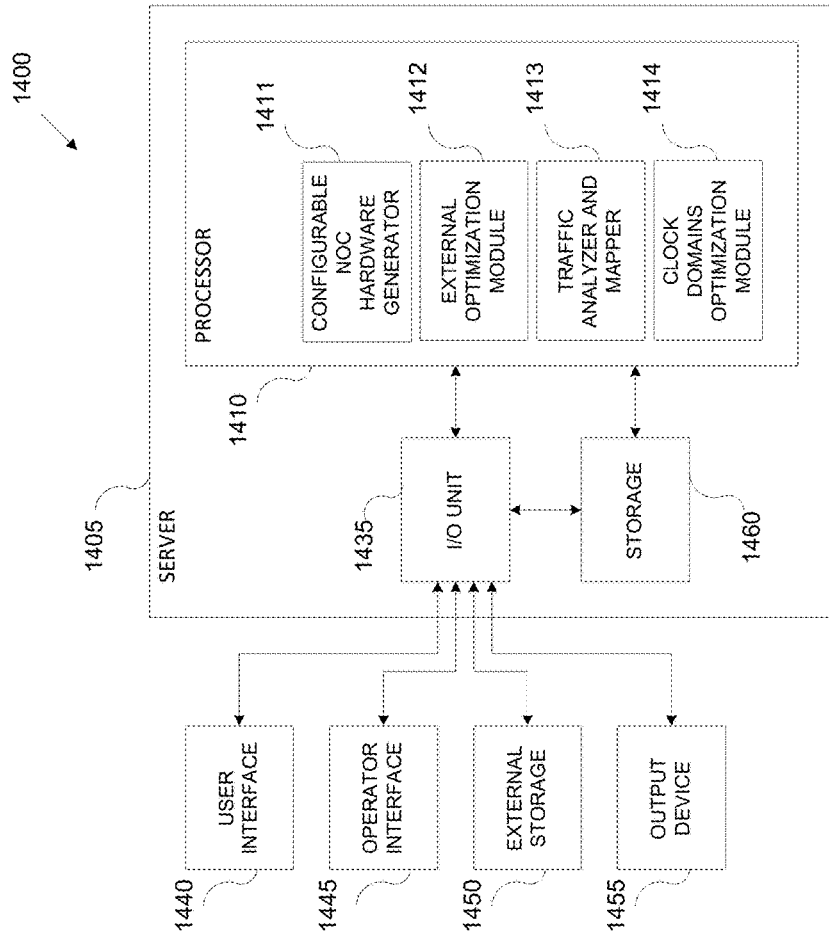
FIG. 14 illustrates a computer/server block diagram upon which the example implementations described herein may be implemented.

FIG. 14 illustrates an example computer system 1400 on which example implementations may be implemented. The computer system 1400 includes a server 1405 which may involve an I/O unit 1435, storage 1460, and a processor 1410 operable to execute one or more units as known to one of skill in the art. The term "computer-readable medium" as used herein refers to any medium that participates in providing instructions to processor 1410 for execution, which may come in the form of computer-readable storage mediums, such as, but not limited to optical disks, magnetic disks, read-only memories, random access memories, solid state devices and drives, or any other types of tangible media suitable for storing electronic information, or computer-readable signal mediums, which can include transitory media such as carrier waves. The I/O unit processes input from user interfaces 1440 and operator interfaces 1445 which may utilize input devices such as a keyboard, mouse, touch device, or verbal command.

The server 1405 may also be connected to an external storage 1450, which can contain removable storage such as a portable hard drive, optical media (CD or DVD), disk media or any other medium from which a computer can read executable code. The server may also be connected an output device 1455, such as a display to output data and other information to a user, as well as request additional information from a user. The connections from the server 1405 to the user interface 1440, the operator interface 1445, the external storage 1450, and the output device 1455 may via wireless protocols, such as the 802.11 standards, Bluetooth® or cellular protocols, or via physical transmission media, such as cables or fiber optics. The output device 1455 may therefore further act as an input device for interacting with a user.

The processor 1410 may execute one or more modules. Clock domain optimization module 1414, may implement the example flow from FIG. 13 to construct a NoC with arbitrary clock domain partitions based on the architecture presented in the application. The configurable NoC hardware generator 1411 can be used by the clock domain optimization module 1414 to generate the NoC RTL with hardware blocks specialized for clock domain crossing. The external optimization module 1412 can be used by the clock domain optimization module 1414 to perform the optimization of block placement and VC buffer widths. The traffic analyzer and mapper module 1413 can be utilized by the clock domain optimization module to identify point-to-point NoC links.

Some portions of the detailed description are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the example embodiments, the steps carried out require physical manipulations of tangible quantities for achieving a tangible result.

Other implementations of the example embodiments will be apparent to those skilled in the art from consideration of the specification and practice of the example embodiments disclosed herein. Various aspects and/or components of the described example embodiments may be used singly or in any combination. It is intended that the specification and examples be considered as examples, with a true scope and spirit of the embodiments being indicated by the following claims.

What is claimed is:

1. A Network on Chip (NoC) comprising:
   a plurality of routers; and
   a plurality of virtual channels;
   wherein each of the plurality of routers and each of the plurality of virtual channels are associated with one or more of a plurality of sections;
   wherein each of the plurality of sections operate at a clock domain such that at least one of the plurality of sections operates at a different clock domain from another one of the plurality of sections, wherein of the plurality of sections having a same clock domain are clustered to minimize clock crossing links;
   wherein the clock domain crossing is facilitated at the virtual channels present between ones of the plurality of sections that operate at different clock domains through use of one or more buffers, wherein each of the virtual channels is assigned one or more buffers configured as a clock domain crossing structure for the each of the virtual channels;
   wherein each router of the plurality of routers is configured to synchronize incoming data to a clock domain of the each router at an input virtual channel and synchronize an outgoing credit return to another clock domain of a source virtual channel of another router of the plurality of routers;
   wherein each port in a router from the plurality of routers is configured such that at least one of the each port facilitates a different clock domain from another one of the each port.

2. The NoC of claim 1, wherein ones of the plurality of routers and ones of the plurality of virtual channels are configured to operate at multiple clock domains and to facilitate clock domain crossing of communications.

3. The NoC of claim 1, wherein each of the plurality of routers includes a clock architecture comprising an independent core clock and an independent clock for each input port of the each of the plurality of routers.

4. The NoC of claim 3, wherein the clock domain of the independent core clock operates in a synchronous, ratio-synchronous, mesochronous or asynchronous relationship with at least one of the clock domains of the independent clock for each input port.

5. The NoC of claim 3, wherein ones of the plurality of routers are configured to facilitate clock domain crossing of communications at each input port, from a clock domain of each input port to a clock domain of the independent core clock.

6. A method for generating a Network on Chip (NoC), comprising: determining, from a specification comprising a plurality of clock domains that are different from each other, a NoC configuration of a plurality of routers and a plurality of virtual channels such that clock domain crossing is minimized; and
   generate a NoC Register Transfer Level (RTL) comprising a plurality of sections such that at least one of the plurality of sections operates at a different clock domain from another one of the plurality of sections, the plurality of sections having a same clock domain are clustered to minimize clock crossing links;
   wherein the clock domain crossing is facilitated at the virtual channels present between ones of the plurality of sections that operate at different clock domains through use of one or more buffers, wherein each of the virtual channels is assigned one or more buffers configured as a clock domain crossing structure for the each of the virtual channels;
   wherein each router of the plurality of routers is configured to synchronize incoming data to a clock domain of the each router at an input virtual channel and synchronize an outgoing credit return to another clock domain of a source virtual channel of another router of the plurality of routers;
   wherein each port in a router from the plurality of routers is configured such that at least one of the each port facilitates a different clock domain from another one of the each port.

7. The method of claim 6, further comprising determining, for each of the plurality of routers, a logic design configured to facilitate flow-control credit across at least two of the plurality of clock domains.

8. The method of claim 6, further comprising configuring one or more input ports of one or more of the plurality of routers to provide synchronization logic for clock domain crossing.

9. The method of claim 6, further comprising configuring a clock architecture of one or more of the plurality of routers to include an independent clock for at least one input port and an independent core clock.

10. The method of claim 9, further comprising configuring one or more of the plurality of routers to facilitate clock domain crossing between the independent clock for at least one input port and the independent core clock.

11. The method of claim 10, wherein the independent clock and the independent core clock have one of a synchronous, ratio-synchronous, mesochronous or asynchronous relationship.

12. A system, comprising:
    a memory; and
    a processor configured to generate a Network on Chip (NoC) register transfer level (RTL) having a plurality of routers and a plurality of virtual channels, wherein each of the plurality of routers and each of the plurality of virtual channels are associated with one or more of a plurality of sections;
    wherein each of the plurality of sections operate at a clock domain such that at least one of the plurality of sections operates at a different clock domain from another one of the plurality of sections, wherein the plurality of sections having a same clock domain are clustered to minimize clock crossing links;

wherein the clock domain crossing is facilitated at the virtual channels present between ones of the plurality of sections that operate at different clock domains through use of one or more buffers, wherein each of the virtual channels is assigned one or more buffers configured as a clock domain crossing structure for the each of the virtual channels;

wherein each router of the plurality of routers is configured to synchronize incoming data to a clock domain of the each router at an input virtual channel and synchronize an outgoing credit return to another clock domain of a source virtual channel of another router of the plurality of routers;

wherein each port in a router from the plurality of routers is configured such that at least one of the each port facilitates a different clock domain from another one of the each port.

13. The system of claim 12, wherein the processor is further configured to generate the NoC RTL such that ones of the plurality of routers and ones of the plurality of interconnects are configured to operate at multiple clock domains and to facilitate clock domain crossing of communications.

14. The system of claim 12, wherein the processor is further configured to generate the NoC RTL such that each of the plurality of routers includes a clock architecture comprising an independent core clock and an independent clock for each input port of the each of the plurality of routers.

15. The system of claim 14, wherein the processor is further configured to generate the NoC RTL such that the clock domain of the independent core clock operates in a synchronous, ratio-synchronous, mesochronous or asynchronous relationship with at least one of the clock domains of the independent clock for each input port.

16. The system of claim 14, wherein the processor is further configured to generate the NoC RTL such that ones of the plurality of routers are configured to facilitate clock domain crossing of communications at each input port, from a clock domain of each input port to a clock domain of the independent core clock.

17. The system of claim 12, wherein the processor is further configured to generate the NoC RTL such that ones of the plurality of routers are configured to operate at multiple clock domains by use of a credit synchronization circuit comprising one or more dual rank synchronizers configured to change operation of the ones of the plurality of routers between a read clock domain and a write clock domain.

* * * * *